Aug. 18, 1925.
J. H. NIGH
1,549,920
MOLD CENTERING DEVICE
Filed Oct. 20, 1921
2 Sheets-Sheet 1
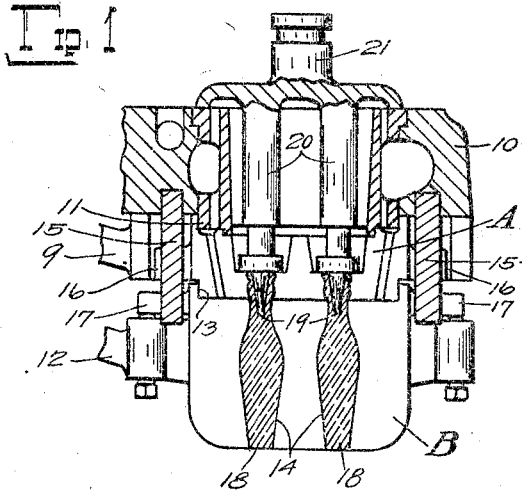
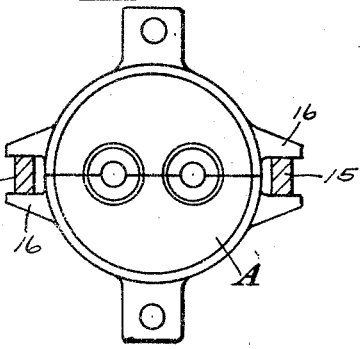
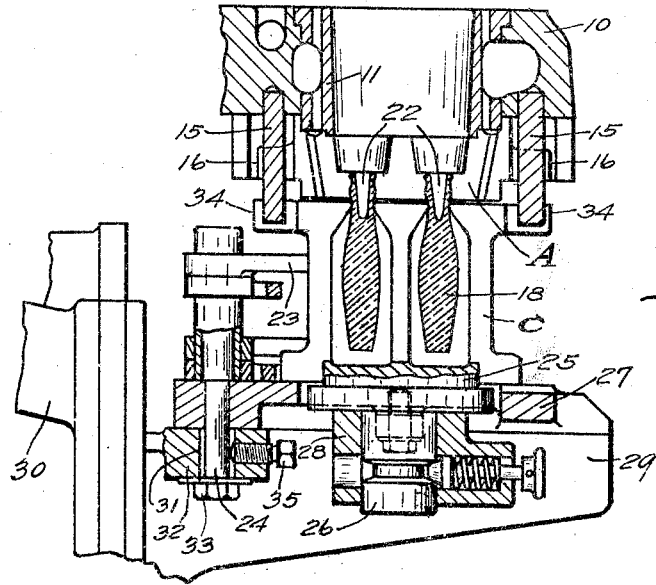
INVENTOR
JAMES H. NIGH
BY J. F. Rule
HIS ATTORNEY Aug. 18, 1925.
J. H. NIGH
1,549,920
MOLD CENTERING DEVICE
Filed Oct. 20, 1921   2 Sheets-Sheet 2
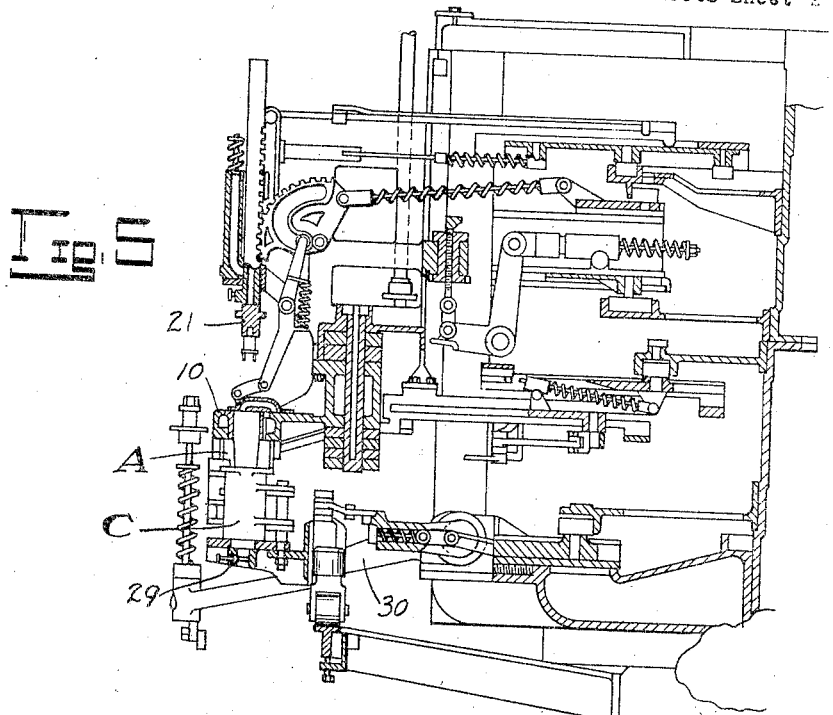
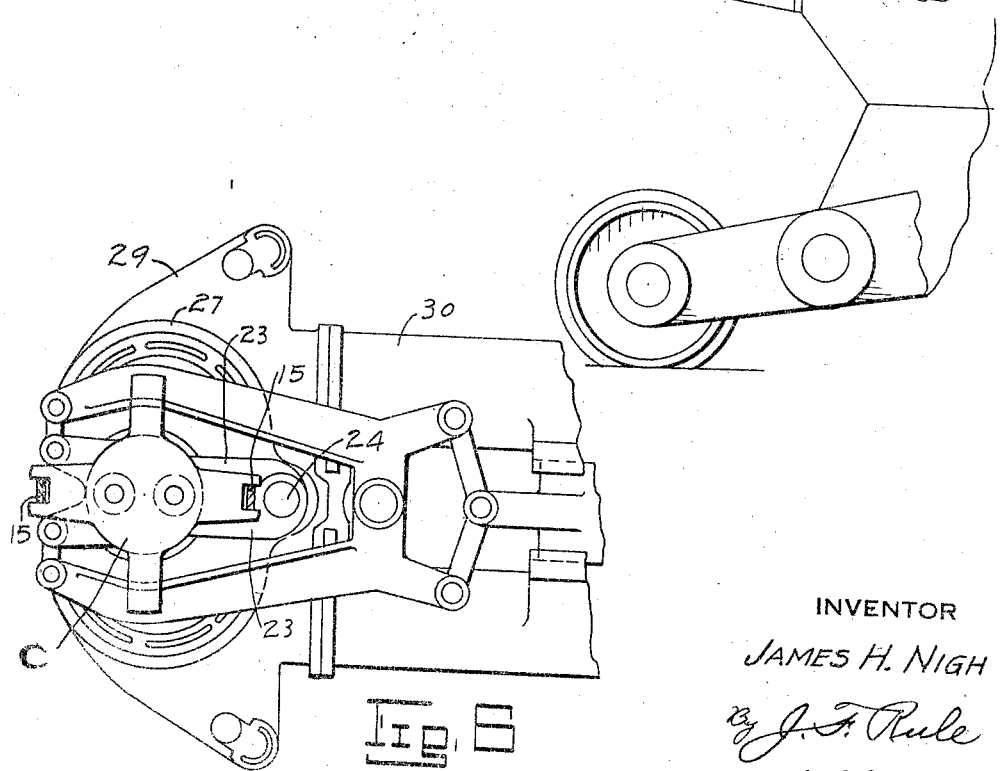
INVENTOR
JAMES H. NIGH
By J. F. Rule
His Attorney Patented Aug. 18, 1925.

1,549,920

UNITED STATES PATENT OFFICE.

JAMES H. NIGH, OF FAIRMONT, WEST VIRGINIA, ASSIGNOR TO THE OWENS BOTTLE COMPANY, OF TOLEDO, OHIO, A CORPORATION OF OHIO.

MOLD-CENTERING DEVICE.

Application filed October 20, 1921. Serial No. 509,199.

*To all whom it may concern:*

Be it known that I, JAMES H. NIGH, a citizen of the United States, residing at Fairmont, in the county of Marion and State of West Virginia, have invented new and useful Improvements in Mold-Centering Devices, of which the following is a specification.

My invention relates to means for centering or aligning the molds in a glass forming machine, and particularly to centering pins arranged to center or align the blank molds and finishing molds with the neck molds.

In machines of the type to which my invention is herein shown applied, a body blank mold and a neck mold are brought together to form a parison mold into which the glass is drawn by suction. Later, the blank mold is withdrawn and replaced by a finishing mold in which the bottle or other glass article is blown to its finished form while the neck end of the article is still retained in the neck mold.

It is important to maintain the blank mold and the finishing mold in exact alignment with the neck mold during the glass gathering and blowing operations respectively, in order to prevent defects in the finished ware. It is customary to removably mount the various mold sections in supports or holders which permit a limited amount of rotative movement of said sections. Such rotative movement is not a serious objection where the usual single molds are employed, but becomes a serious objection when plural molds are used, that is, molds having a plurality of mold cavities, as any such rotative movement of one mold part relative to another throws the mold cavities out of alignment. An object of the present invention is to provide improved means to bring the molds into exact alignment and prevent any such relative movement.

In the accompanying drawings:

Figure 1 is a sectional elevation showing a blank mold and neck mold held in alignment, in accordance with my invention.

Figure 2 is a plan view of a neck mold and shows the centering pins in section.

Figure 3 is a detail view showing adjusting means for the pivot pin for the finishing mold sections.

Figure 4 is a sectional elevation showing the neck mold and finishing mold in register.

Figure 5 is a sectional elevation of a portion of a glass blowing machine to which my invention is applied.

Figure 6 is a plan view of the finishing mold and associated parts, the centering pins being shown in section.

The invention is herein shown as adapted to an Owens automatic bottle blowing machine such as shown and described, for example, in the United States Patent to La France, #1,185,687, dated June 6, 1916. This machine includes a number of heads or units each comprising a neck mold A, a blank mold B and a finishing mold C. The neck mold comprises horizontally separable sections carried on arms 9 by which said sections are supported directly beneath a head 10, said sections when brough together being positioned by an adapter 11 in the head 10. The body blank mold B is also made in sections removably supported on arms 12. When the blank mold is brought into register with the neck mold, as shown in Figure 1, an annular shoulder 13 on the blank mold surrounds the lower end of the neck mold, holding the molds in substantial alignment. The blank mold is formed with a plurality of mold cavities 14 which register with corresponding mold cavities in the neck mold.

In order to hold the neck mold and blank mold in exact register and prevent relative rotative movement of the mold sections, I provide rectangular centering pins 15 fixed in the head 10 and depending therefrom. Lugs 16 on the neck mold sections engage the centering pins and accurately position the neck mold sections on their supporting arms 9 and hold them against rotative movement about a vertical axis. Lugs 17 on the blank mold sections also engage said centering pins as the blank mold sections are brought together and automatically effect any rotative adjustment of the blank mold sections on the arms 9 that may be necessary to align them with the neck mold and hold the blank mold in exact register with the neck mold.

The head 10 is lowered to bring the blank mold into contact with a supply of molten glass and the glass is drawn into the mold by suction to form the parisons 18. Cores 19 carried by plungers 20 on a plunger head 21, project downward through the neck mold while the charges of glass are being gathered. After the glass has been gathered the blank mold sections are separated, leaving the parisons suspended from the neck mold. The finishing mold sections are now brought together in register with the neck mold so that the parisons 18 are enclosed, as shown in Figure 4. The plunger head 21 is also lifted to withdraw the cores 19, leaving initial blow openings 22 in the parisons. Air under pressure is supplied at these openings to blow the parisons to their finished form.

The finishing mold comprises separable sections removably supported on carrying arms 23 fulcrumed on a pivot pin 24. A mold bottom 25 for the finishing mold is provided with a cylindrical extension 26 depending therefrom, the mold bottom being supported by a plate or arm 27 to which is fixed an extension 28 in the form of a sleeve surrounding the mold bottom extension 26. The supporting plate 27 rests on an extension or bracket 29 on the head 30 which carries the finishing mold. The pivot bolt 24 extends through an opening 31 in a boss 32 on the head 30. The supporting plate 27 is clamped to said boss by means of a nut 33.

The finishing mold sections are formed with lugs 34 which engage the centering pins 15 and thereby align the finishing molds with the neck molds in the same manner as the blank molds are registered with the neck molds. The centering pins prevent rotative movement of the finishing mold relative to the neck mold and also hold the finishing mold sections against displacement relative to the neck mold in the direction of their movement toward and from the centering pins.

In order to adjust the finishing mold in a direction perpendicular to the direction of movement of the mold sections toward and from the centering pins, I provide means for adjusting the pivot pin 24 toward and from the center of the machine. For this purpose the opening 31 in the boss 32 is made larger than the diameter of the pivot pin. As the supporting plate 27 fits closely on the pivot pin, any adjustment of the latter carries with it the finishing mold. To effect such adjustment the nut 33 is loosened and an adjusting screw 35 is set up, thereby moving the pivot pin 24 laterally toward the center of the machine to bring the finishing mold into exact register with the neck mold. The adjusting screw 35 also serves to prevent the mold from working out of adjustment, as in the type of machine shown the tendency of the mold is always to work outward or away from the center of the machine.

Modifications may be resorted to within the spirit and scope of my invention.

What I claim is:

1. The combination of a neck mold, a blank mold and a finishing mold movable into register alternatively with the neck mold, said molds each mounted for rotative movement about an axis extending centrally through the mold, and a centering pin operable to control the rotative position of both the blank mold and finishing mold about said axis when said molds are in register with the neck mold.

2. The combination of a neck mold, a blank mold and a finishing mold movable into register alternatively with the neck mold, each of said molds comprising sections movable to and from each other to close and open the mold, and a centering device common to all of said molds and operable as each mold is closed to determine its rotative position about the central axis of the mold.

3. The combination of molds separately movable to and from a position in which they are in alignment or in register, and a centering pin, said pin being operable to limit the rotative movement about the central vertical axis of each mold separately as it is brought to said position and thereby bring the molds into exact register.

4. The combination of a sectional mold comprising sections movable to and from each other, a centering pin by which the rotative position of the mold sections about their central axis is determined as they are brought together, and a second sectional mold having sections movable together to bring it in register with the first mentioned mold, said centering pin arranged to position said second mentioned mold as its sections are brought together, said pin controlling the rotative position of each mold separately.

5. The combination of a sectional blank mold, a sectional finishing mold, a neck mold, the blank mold sections and the finishing mold sections being movable alternately into register with the neck mold, and a centering pin arranged to rotate the individual mold sections about their central vertical axis and thereby bring said mold sections into alignment with the neck mold.

6. The combination of a sectional blank mold, a sectional finishing mold, a neck mold, the blank mold sections and the finishing mold sections being movable alternately into register with the neck mold, and a centering pin arranged to align both the blank mold and finishing mold with the neck mold, said centering pin also being arranged to determine the rotative position of the neck mold about its central vertical axis.

7. The combination of a support, a centering pin extending therefrom, a mold comprising sections movable to and from each other, lugs on said sections positioned to engage said pin when the mold sections are brought together, a second sectional mold comprising sections movable to and from each other, said second mold being in register with the first mold when its sections are brought together, and lugs on said second mold to engage said centering pin and thereby align the two molds.

8. The combination of a support, a centering pin extending therefrom, a mold comprising sections movable to and from each other, lugs on said sections positioned to engage said pin when the mold sections are brought together, a second sectional mold comprising sections movable to and from each other, said second mold being in register with the first mold when its sections are brought together, lugs on said second mold to engage said centering pin and thereby align the two molds, and a third mold movable in alternation with the second mold into register with the first mold, said third mold having surfaces to engage said centering pin and align it with the first mold.

9. The combination of a support, rectangular centering pins fixed to and depending therefrom, a neck mold having sections movable to and from each other beneath said support, a sectional blank mold and a sectional finishing mold movable alternatively into register with the neck mold, each of said molds having projecting lugs arranged to engage said centering pins and thereby center said molds.

10. The combination of a sectional mold having a plurality of mold cavities, a second mold having mold cavities movable into register with the first mentioned mold cavities, and a centering pin arranged to control the rotative position of both molds about their central axis and thereby center the mold cavities of one mold with respect to those of the other mold.

11. The combination of a sectional mold, supporting arms on which the mold sections are mounted, a second sectional mold movable into register with the first mold, arms on which the second mold sections are mounted, and a centering pin arranged to engage the sections of both molds and thereby determine the rotative position of the mold sections on their supporting arms.

12. The combination of a sectional mold, supporting arms on which the mold sections are mounted, a second sectional mold movable into register with the first mold, arms on which the second mold sections are mounted, a centering pin arranged to engage the sections of both molds and thereby determine the rotative position of the mold sections on their supporting arms, a fulcrum pin on which the supporting arms for one mold are fulcrumed, and means to adjust said pin in a direction transverse to its length and thereby align one mold with the other.

13. The combination of a neck mold, a sectional mold to register therewith, arms on which the sections of said sectional mold are supported, a pivot pin forming a fulcrum for said arms, a centering pin by which said sectional mold is aligned in one direction with respect to the neck mold, and means for adjustment of said fulcrum pin for alignment of the sectional mold in a direction transverse to said first mentioned direction.

14. The combination of a centering pin, and molds movable alternatively into position to engage said pin, and thereby cause a rotation of said molds about their central vertical axis.

15. The combination of a centering device, and sectional molds movable alternatively to a closed position in which their axial rotation is controlled by said device.

16. The combination of molds each comprising separable sections, and a centering pin between the sections of the molds, each of said molds being arranged to be rotated about its central vertical axis by said pin as its sections are brought together.

17. The combination of molds each comprising separable sections, and a centering pin between the mold sections, said molds arranged at different positions lengthwise of said pin and controlled in their axial rotation by the pin when their sections are brought together.

Signed at Fairmount, in the county of Marion and State of West Virginia, this 13 day of October, 1921.

JAMES H. NIGH.